UNITED STATES PATENT OFFICE.

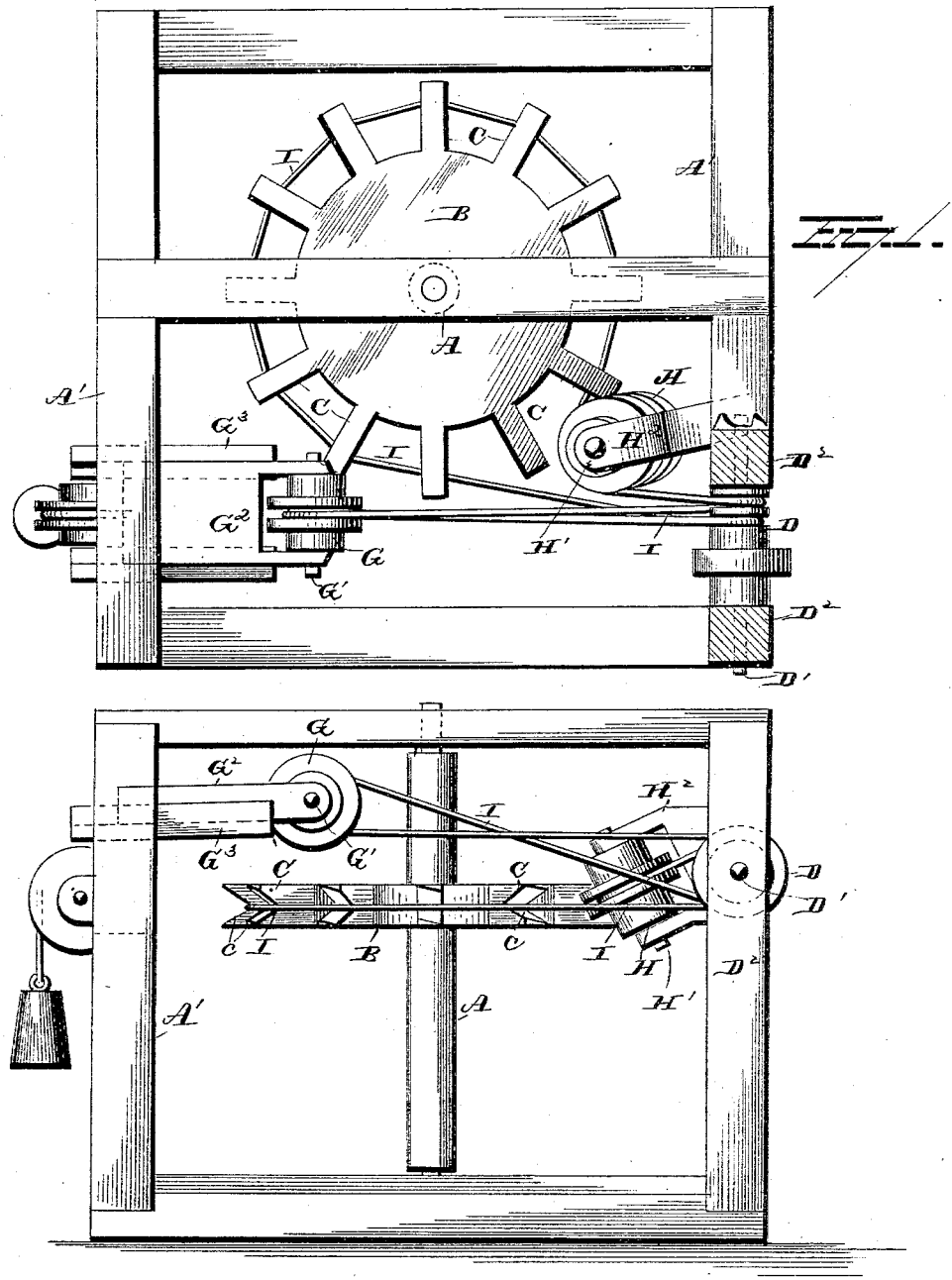

ROBERT H. TISDALE, OF SUMTER, SOUTH CAROLINA.

HORSE-POWER.

SPECIFICATION forming part of Letters Patent No. 300,411, dated June 17, 1884.

Application filed December 6, 1883. (No model.)

*To all whom it may concern:*

Be it known that I, ROBERT H. TISDALE, of Sumter, in the county of Sumter and State of South Carolina, have invented certain new and useful Improvements in Horse-Powers; and I do hereby declare the following to be a full, clear, and exact description of the invention, such as will enable others skilled in the art to which it appertains to make and use the same.

My invention relates to an improvement in horse-powers, the object being to so construct and arrange the different pulleys and so pass an endless belt or rope around them that all danger of the rope slipping thereon will be overcome; and with these ends in view my invention consists in certain novel features of construction and arrangement of parts, as will be hereinafter described, and pointed out in the claims.

In the accompanying drawings, Figure 1 is a view of my improvement, showing the relative positions of the pulleys and the path of the endless rope around them. Fig. 2 is a view thereof in side elevation.

A represents a vertical shaft journaled in bearings at its upper and lower ends in the frame-pieces A', and to which is rigidly secured the drive or master wheel B. The rim of this wheel is provided at suitable intervals apart with teeth or prongs C, the grooves $c$ in which are cut diagonally, and through which passes an endless-belt rope, I, to be hereinafter referred to, the grooves in said teeth or prongs being adapted to tightly grasp and hold the rope and prevent the same from slipping when the machine is in motion.

D represents the double-grooved band-wheel pulley, adapted to revolve on the axle D', secured in the uprights $D^2$, said pulleys being situated in a plane at right angles with that of the drive-wheel B, and from which power is transmitted to the machine or apparatus it is desired to operate. In the same vertical plane with the pulley D, and near the master-wheel B, is situated the tension-pulley G, adapted to revolve on the axle G', secured to the sliding pieces $G^2$, adapted to move in a straight line either toward or away from the pulley D by means of the guides $G^3$, secured to the frame.

This sliding piece may be secured at any point of its adjustment, and thus retain the rope at any desired tension.

H represents a guide-pulley mounted on an axle, H', secured in the frame-piece $H^2$, said pulley being situated near the wheel B and in a plane at an angle therewith. Around these pulleys passes an endless rope or belt, I, which latter fits in between the teeth or prongs C, formed on the drive-wheel B, as before described, the rope then passing around the rim of the guide-pulley H, around the double-grooved pulley D, then to the tension-pulley G, back to the pulley D, and then around the wheel B. It will now be readily seen that from this construction and arrangement of parts the rope bears on nearly every portion of the rim of the wheel B and passes twice around the band-pulley D, which creates sufficient friction between the rope and pulleys to prevent any slipping of the rope on the latter, the said rope being kept sufficiently tight by means of the tension-pulley G.

Having fully described my invention, what I claim as new, and desire to secure by Letters Patent, is—

1. The combination, with a drive-wheel, of a guide-pulley, tension-pulley, a double-grooved band-pulley, and an endless rope passing from said wheel around the guide-pulley, around the band-wheel, the tension-pulley, back around said band-pulley, and then back around said wheel, the above parts being arranged to operate substantially as set forth.

2. The combination, with a horizontal drive-wheel provided on its rim with teeth or prongs, of a guide-pulley situated in close proximity thereto, a vertical-tension pulley, a double-grooved band-pulley, and an endless rope or its equivalent, all of the above parts being constructed and arranged to operate substantially as set forth.

In testimony whereof I have signed this specification in the presence of two subscribing witnesses.

R. H. TISDALE.

Witnesses:
JOHN J. BRUNSON,
THOMAS B. BRUNSON.